US009794324B2

(12) United States Patent
Boden et al.

(10) Patent No.: US 9,794,324 B2
(45) Date of Patent: Oct. 17, 2017

(54) APPLICATION FUNCTION DEPENDENT POLICY CONTROL

(71) Applicant: Telefonaktiebolaget L M Ericsson (publ), Stockholm (SE)

(72) Inventors: Bjorn Boden, Sunne (SE); Pablo Molinero Fernandez, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 144 days.

(21) Appl. No.: 14/068,163

(22) Filed: Oct. 31, 2013

(65) Prior Publication Data

US 2014/0129692 A1    May 8, 2014

Related U.S. Application Data

(60) Provisional application No. 61/723,429, filed on Nov. 7, 2012.

(30) Foreign Application Priority Data

Nov. 2, 2012  (EP) .................................... 12191109

(51) Int. Cl.
*G06F 15/173* (2006.01)
*H04L 29/08* (2006.01)
(Continued)

(52) U.S. Cl.
CPC .......... *H04L 67/10* (2013.01); *H04L 41/0893* (2013.01); *H04L 43/026* (2013.01)

(58) Field of Classification Search
None
See application file for complete search history.

(56) References Cited

U.S. PATENT DOCUMENTS 8,023,425 B2 * 9/2011 Raleigh ......................... 370/252
8,027,296 B2 * 9/2011 Hu .......................... H04L 12/14
                                                        370/329

(Continued)

OTHER PUBLICATIONS

Official action issued on Mar. 19, 2015 in corresponding European patent application No. 12 191 109.3, 6 pages.

(Continued)

*Primary Examiner* — Yves Dalencourt
(74) *Attorney, Agent, or Firm* — Rothwell, Figg, Ernst & Manbeck, P.C.

(57) ABSTRACT

The invention relates to an application function entity (100, 200, 300) configured to control policy rules of a packet based service data flow that is transmitted to a subscriber of a mobile communications network. The application function entity comprises a policy server (110) configured to control the policy rules of said packet based service data flow, the policy server containing a first interface (111) towards a traffic detection entity (140, 150, 65, 70) which detects the packet based service data flows in the mobile communications network. Furthermore, an interface (113) to a database is provided containing information with which policy rules to be applied to packet based service data flows can be determined. The policy server (110) is configured to determine, based on the information in the database (120), the policy for said packet based service data flow and configured to apply the policy rules to said packet based service data flow.

11 Claims, 6 Drawing Sheets

(51) Int. Cl.
*H04L 12/24* (2006.01)
*H04L 12/26* (2006.01)

(56) References Cited

U.S. PATENT DOCUMENTS

| | | | |
|---|---|---|---|
| 8,442,522 B2* | 5/2013 | Pancorbo Marcos et al. | 455/432.1 |
| 8,769,112 B2* | 7/2014 | Zhou et al. | 709/227 |
| 8,817,612 B2* | 8/2014 | Zhou et al. | 370/230 |
| 2008/0046963 A1* | 2/2008 | Grayson | H04L 12/66 726/1 |
| 2008/0271113 A1* | 10/2008 | Belling | 726/1 |
| 2010/0223282 A1* | 9/2010 | Lataste et al. | 707/769 |
| 2011/0208853 A1* | 8/2011 | Castro-Castro et al. | 709/223 |
| 2012/0099715 A1* | 4/2012 | Ravishankar | H04L 12/1407 379/114.01 |
| 2012/0246325 A1* | 9/2012 | Pancorbo Marcos et al. | 709/227 |
| 2014/0013383 A1* | 1/2014 | Pancorbo-Marcos et al. | 726/1 |
| 2014/0064151 A1* | 3/2014 | Shaik | H04M 15/64 370/259 |
| 2015/0081903 A1* | 3/2015 | Molinero Fernandez et al. | 709/225 |

OTHER PUBLICATIONS

The Extended European Search Report issued in Application No. 12191109.3 dated May 3, 2013.

3GPP: "3rd Generation Partnership Project; Technical Specification Group Core Network and Terminals; Policy and Charging Control (PCC) over Gx/Sd reference point (Release 11)," 3GPP Draft; 3GPP TS 29.212, V11.5.0, 3RD Generation Partnership Project (3GPP), Mobile Competence Centre; 650, Route Des Lucioles; F-06921 Sophia-Antipolis Cedex, France, Jun. 25, 2012, XP0500588863, 194 pages.

3GPP: "3rd Generation Partnership Project; Technical Specification Group Services and System Aspects; Policy and Charging Control Architecture (Release 11)," 3GPP TS 23.203, V11.6.0, 3RD Generation Partnership Project (3GPP), Mobile Competence Centre; 650, Route Des Lucioles; F-06921 Sophia-Antipolis Cedex, France, Jun. 2012, 177 pages.

* cited by examiner

APPLICATION FUNCTION DEPENDENT POLICY CONTROL

CROSS REFERENCE TO RELATED APPLICATIONS

This application 1) claims the benefit of U.S. Provisional Patent Application No. 61/723,429, filed on Nov. 7, 2012, and 2) claims priority to European Patent Application No. EP 12191109.3, filed on Nov. 2, 2012. The above identified applications are incorporated by reference in their entirety.

TECHNICAL FIELD

The present invention relates to an application function entity configured to control policy rules of a packet based service data flow and to a method for controlling the policy rules by the application function.

BACKGROUND

Figure 1:
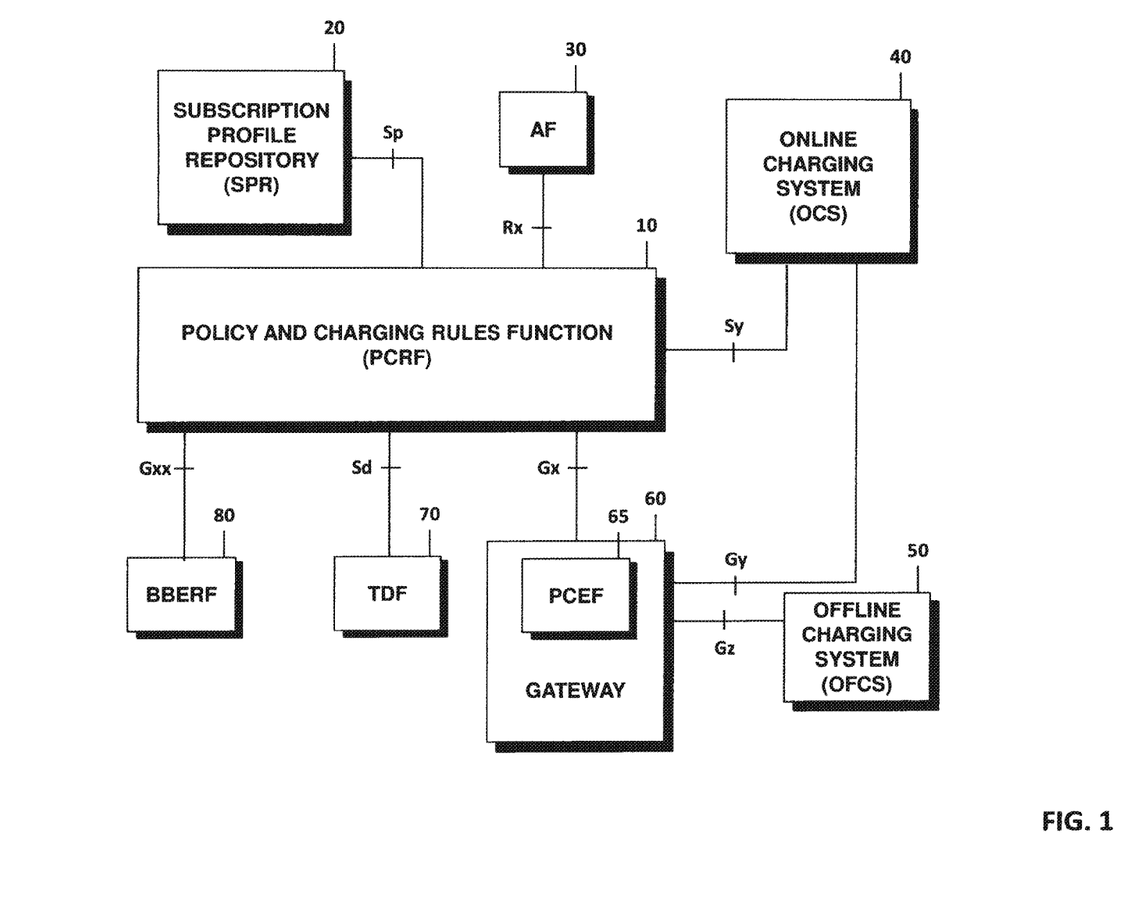
FIG. 1 schematically shows the PCC architecture known in the art.

An application function (AF) is an element offering applications that require dynamic policy and charging control. An application function provides a service to the user, in which a packet based service data flow is provided to the user, e.g. the streaming of video and/or audio data packets from a content provider to a subscriber of a mobile communications network. The application function may for example be attached to or part of the 3GPP Policy and Charging (PCC) architecture which is shown in FIG. 1 and is known from 3GPP TS 23.203. The main orchestrator in the PCC architecture is the Policy and Charging Rules Function (PCRF) shown with reference numeral 10 in FIG. 1. A subscriber profile repository, SPR 20, is connected to the PCRF 10 via an Sp interface, the application function 30 communicating with the PCRF via the Rx interface. An online charging system (OCS) 40 is provided and an offline charging system (OFCS) 50. A gateway 60 containing the PCEF (Policy and Charging Enforcement Function) 65 is in communication with the online charging system 40, the offline charging system 50 and the PCRF 10 via the Gy, Gz and Gx interface, respectively, as shown in FIG. 1. A traffic detection function (TDF) 70 is provided and a Bearer Binding and Event Reporting Function (BBERF) 80. Further details about the different functions can be found in the above-mentioned 3GPP TS 23.203. For the present invention, the following interfaces between the entities are of interest.

Rx: Allows the AF to request the PCRF to modify a user's connection parameters since the AF has detected that the user uses a service that would need these detections. The PCRF can also signal in case the connection for a user changes that the AF earlier has requested to be changed.

Gx: Allows the PCRF to configure the PCEF with policy control and charging rules and allows the PCEF to report to the PCRF when new data flows are detected for a user and also to report accumulated usage of the data flows for a user.

Sd: Allows the PCRF to have dynamic control of application detection, compared to the Gx interface where the only detection of predefined applications can be reported by the PCEF. The PCRF instructs the TDF which applications it wants the TDF to detect and the TDF sends notifications when detecting an application.

By implementing an application function, the application function has to be able to detect user services that then require Rx signaling to be made. In general, three main approaches to enable this detection in the application function can be identified.

In a first approach, a user equipment (UE) uses a control signaling to the application function. In this approach, data is sent from the UE that is terminated in informing the application function that a service will be used and which will trigger the AF to do Rx signaling. This can be considered as control signaling from the UE, although from a 3GPP perspective, the control signaling will go over the data plane. Still, this data is control signaling as it is not part of the real packet based service data flow, such as the data sent to retrieve a video.

The second approach is a communication between the application function and the target host, i.e. the content provider. In this approach, the user service is detected in the target host/content provider of the service which then informs the application function that the service has started or is about to start.

A third approach is that the application function detects a user service with a packet based service data flow by packet inspection. In this approach, the application function is located between the UE and the content provider or target host of the service and can detect that the service started using packet inspection.

The last approach has the advantage that it does not require awareness of the application function in the user equipment or the target host.

One problem with the application function in the 3GPP architecture is that the application function often belongs to a different company, organization or department compared to the mobile communications network. For this reason, the Rx interface in the 3GPP architecture between the application function and the PCRF shown in FIG. 1 has limited functionality. No other interfaces between the AF and the network nodes are standardized nor generally expected due to the previous reason. Furthermore, for the same reason it is often not possible to use customization, personalization or adaptation information available in the network node to adjust the application function's behavior to the subscriber profile or the network conditions. To overcome this problem, extensive functionality is needed in the application function for customization, personalization and adaptation needs to be implemented or functionality limitations are needed.

As mentioned above, the third approach is based on the fact that the application function detects the service through packet inspection. The packet inspection functionality may reside within the application function or may be located in another node in a mobile communications network. Even if the packet inspection is located within the application function, the packet inspection implementation in the application function may be running on a separate hardware or may be a distinct piece of software that has already been implemented and used in other products. This is based on the fact that there are multiple other users of packet inspection than for the use in the application function and the packet inspection functionality is available as commercial off-the-shelf hardware or software. In the PCC architecture, packet inspection functionality is part of the PCEF and TDF entities and the Gx and Sd interfaces are used to give application events or report events of detected packets and also to configure the packet inspection entity what packets to send the application events to.

When implementing the application function, according to the third approach using packet inspection, extensive logic is needed in the application function in order to keep track of users and the users' data flows, which policies are used for which users etc. When commercial off-the-shelf software and/or hardware is used for packet inspection, the application function also needs to implement interfaces for communicating with the packet inspection entity. In particular, if the application function used packet inspection functionality usually serving as PCEF or TDF in a mobile communications network, the AF would need to implement the Gx and/or Sd interfaces.

A solution where the application function could utilize already available functionality, both to support the Gx and/or Sd interfaces and the extensive logic needed to keep track of users and users' data flows would reduce the development costs for the application function.

Accordingly, a need exists to customize, personalize or adapt the application function behavior on a per session basis or per subscriber basis. Furthermore, a possible solution should not affect the mobile communications network PCRF.

SUMMARY

This need is met by the features of the independent claims. Further embodiments are described in the dependent claims.

According to a first aspect, an application function entity is provided configured to control policy rules for packet based service data flow that is transmitted to a subscriber of the mobile communications network. The application function entity comprises a policy server configured to control policy rules of said packet based data flow. The policy server furthermore contains a first interface towards the traffic detection entity which detects the packet based service data flows in the mobile communications network. The application function entity furthermore contains an interface to a database containing information with which policy rules to be applied to packet based service data flows can be determined. The policy server is configured to determine the policy for said packet based service data flow based on the information in the database and is configured to apply the policy rules to said packet based service data flow. As the application function contains a policy server and an interface to the policy rules, application function dependent policy rules can be generated and it is possible to customize, personalize or adapt the policy rules independent from the policy rules of the mobile communications network.

The database can contain the policy rules for the packet based service data flows or subscriber information which the policy server takes into account when determining which policy rules are applied to packet based service data flows.

It is possible that the application function entity further contains the traffic detection entity. However, this is not necessarily the case as the traffic detection entity may also be located outside the application function, the policy server only containing the first interface towards the traffic detection entity.

Furthermore, the traffic detection entity can be a packet inspection entity or any other entity which is able to detect and identify a service data flow.

The database containing the policy rules of the packet based service data flows may be a subscriber profile repository of the application function, the subscriber profile repository having subscriber dependent subscriber profiles.

In this embodiment, the policy rules for the packet based service data flow can be determined on a subscriber base. For different subscribers of the mobile communications network, different policies for the application function may be provided. The application function has access to a subscriber profile repository where policy rules can be stored which can be different from the policy rules of the mobile communications network. Furthermore, the policies may be the same for all subscribers. This subscriber profile repository is the application function's repository and is an entity different to the subscriber profile repository of the mobile communications network.

The application function entity may furthermore comprise an application function logic entity which controls the application function. The policy server may then comprise a second interface towards this application function logic. The application function logic may furthermore contain an interface towards the traffic detection entity, to which the policy server of the application function is connected via the first interface.

The interface towards the traffic detection entity may be implemented as an Sd or Gx interface. When these interfaces are used, standardized protocols can be used for the communication between the policy server and the traffic detection entity.

The policy server in the application function may be implemented as a PCRF provided in the application function. In this embodiment, a PCRF would be provided in the mobile communications network, another PCRF being provided in the application function. The PCRF contains all the necessary logic for the policy server. When a PCRF is implemented in the application function, already existing software and hardware components could be used that would significantly decrease the development costs for the application function entity of the invention.

Furthermore, it is possible that the application function logic entity contains interfaces towards the policy and charging rules function entity of the mobile communication network, which may be implemented as an Rx interface.

The invention furthermore provides a method for controlling, by the application function entity, policy rules of the packet based service data flow. According to one step of the method, the packet based service data flows in the mobile communications network are detected. One of the packet based service data flows is identified and the policy for said one packet based service data flow is determined by accessing the database via the interface. Additionally, the determined policy is applied to the identified packet based service data flow.

The database may contain, in addition to the policy rules, charging rules. Furthermore, the policy and charging rules may be subscriber dependent. The subscriber is identified, for which a packet based service data flow is provided, and the subscriber dependent policy and/or charging rules can be applied to identify packet based service data flow.

BRIEF DESCRIPTION OF THE DRAWINGS

The invention will be described in further detail with reference to the accompanying drawings.

DETAILED DESCRIPTION OF EMBODIMENTS

In the following, the invention will be explained in more detail by referring to exemplary embodiments and to the accompanying drawings.

Figure 2:
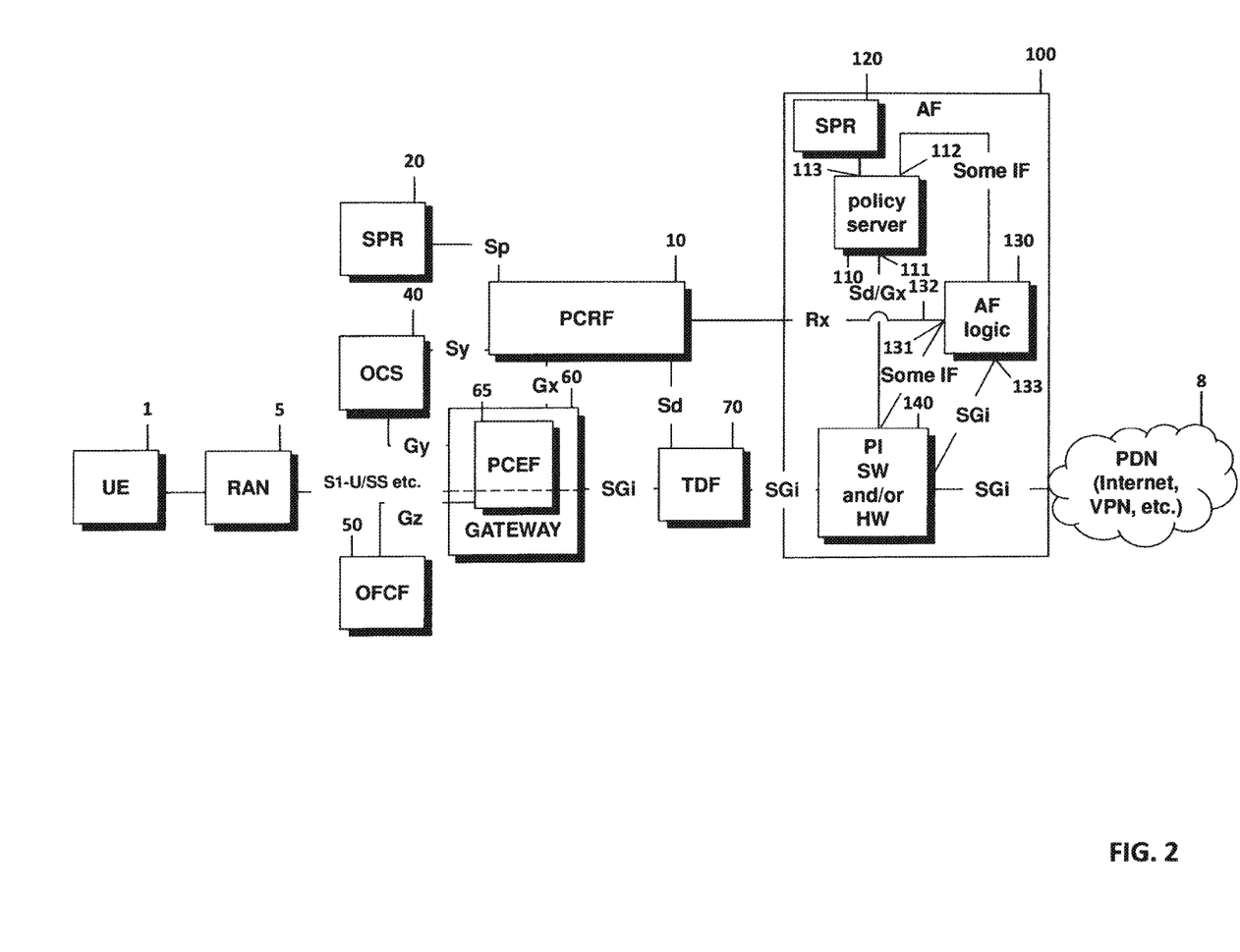
FIG. 2 shows an application function according to an embodiment of the invention.

In FIG. 2, an application function 100 is shown in the context of a PCC architecture as shown in FIG. 1. The function entities 10-70 shown in FIG. 2 correspond to the entities explained above in connection with FIG. 1. A mobile user entity UE 1 accesses the mobile communications network using the radio access network 5.

A packet based service data flow provided by a service provider is transmitted from the packet data network 8 via the SGi interface via gateway 60 to the UE 1. For a service complete policy and/or charging rule information is available. The service is provided by a service provider (not shown) in the packet data network. In the embodiments discussed below, the service data flow is forwarded to the subscriber. However, it should be understood that the service data flow can be a flow forwarded to the service provider or can be a bidirectional flow.

The application function entity 100 comprises a policy server 110. The policy server 110 has its own database containing policy rules or subscriber information which the policy server takes into account when determining which policy rules to apply, or has a connection to such a database. In the embodiment shown in FIG. 2, the database is implemented as a subscriber profile repository 120. The policy server accesses the SPR 120 via interface 113. The subscriber profile repository 120 can be provided within the policy server 110 or may be linked to the policy server 110. The policy server contains a first interface 111 through which a packet inspection entity 140 provided within the application function entity of FIG. 2 can be accessed. The packet inspection entity provides packet inspection functionality and can identify service data flows and the requesting subscriber/UE.

The packet based service data flow may be provided by a content provider. The application function entity 100 may be provided by the content provider, however, the application function entity may also be owned by the network operator or by a broker that facilitates the communication between the network operator and the content provider.

The policy server contains a second interface towards application function logic 130. The application function logic 130 is an entity that controls the application function. One example is an AF that requests higher priority from the network PCRF when certain traffic is detected. Another example is an AF that requests some filtering rules in the PCEF when certain malicious traffic is detected. The policy server can be used for example for fraud prevention (the policy server may hold a list of abusive users who should be restricted from using the AF function).

The application function logic 130 has an interface 131 to the packet inspection entity, an interface 132, implemented as Rx interface in the example shown, towards the PCRF 10 of the mobile communications network. The application function logic can contain a third interface 133, here the SGi interface, which is the user data interface. The interface of the policy server 112 to the application function logic 130 may be implemented as an Gx interface. However, any other interface may be used.

As can be seen from FIG. 2, the packet inspection entity 140 is part of the application function node, but may be running on a separate hardware or distinct piece of software.

Figure 3:
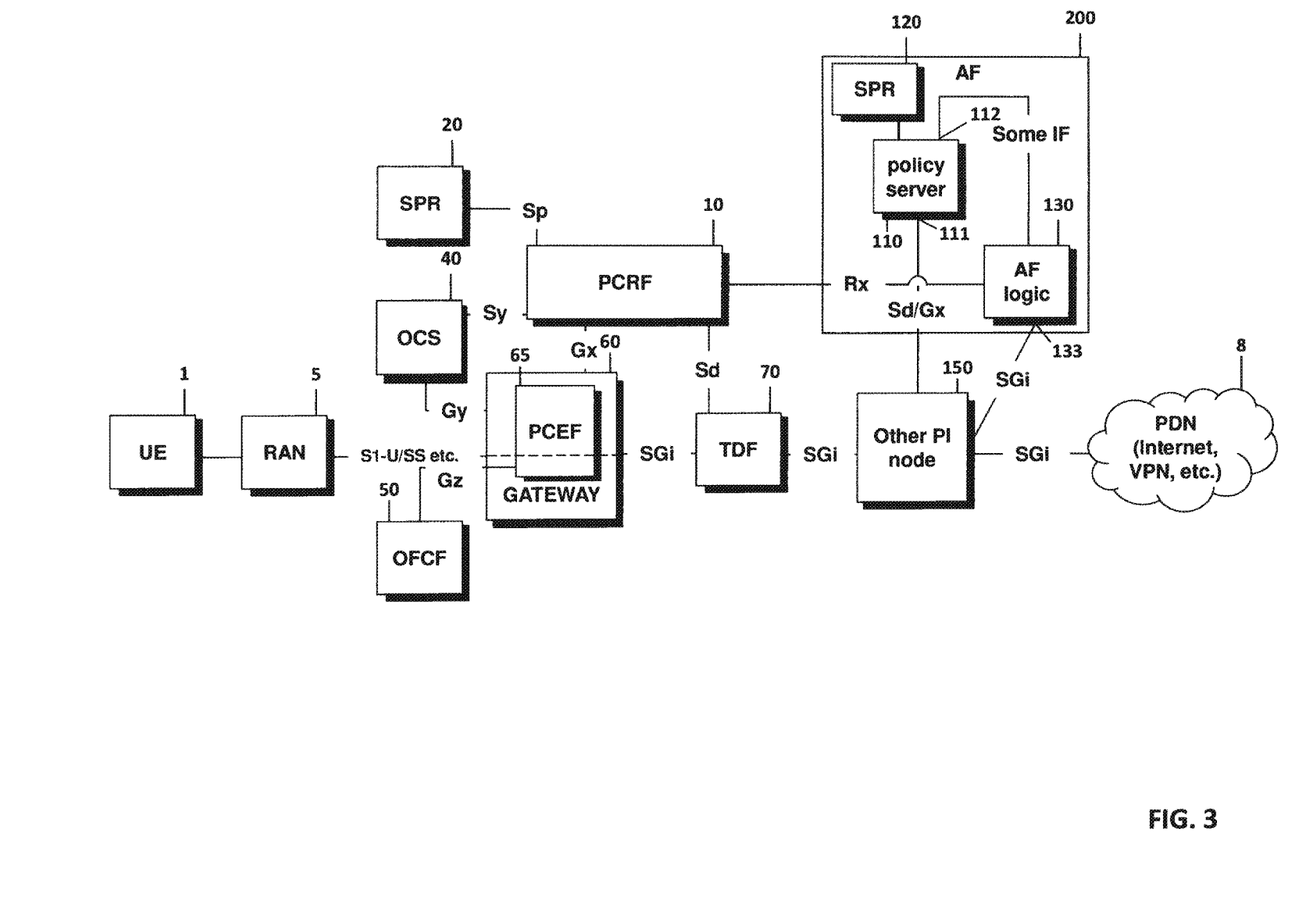
FIG. 3 shows an application function according to an embodiment of the invention, FIG. 4 shown an application function according to an embodiment of the invention.
Figure 4:
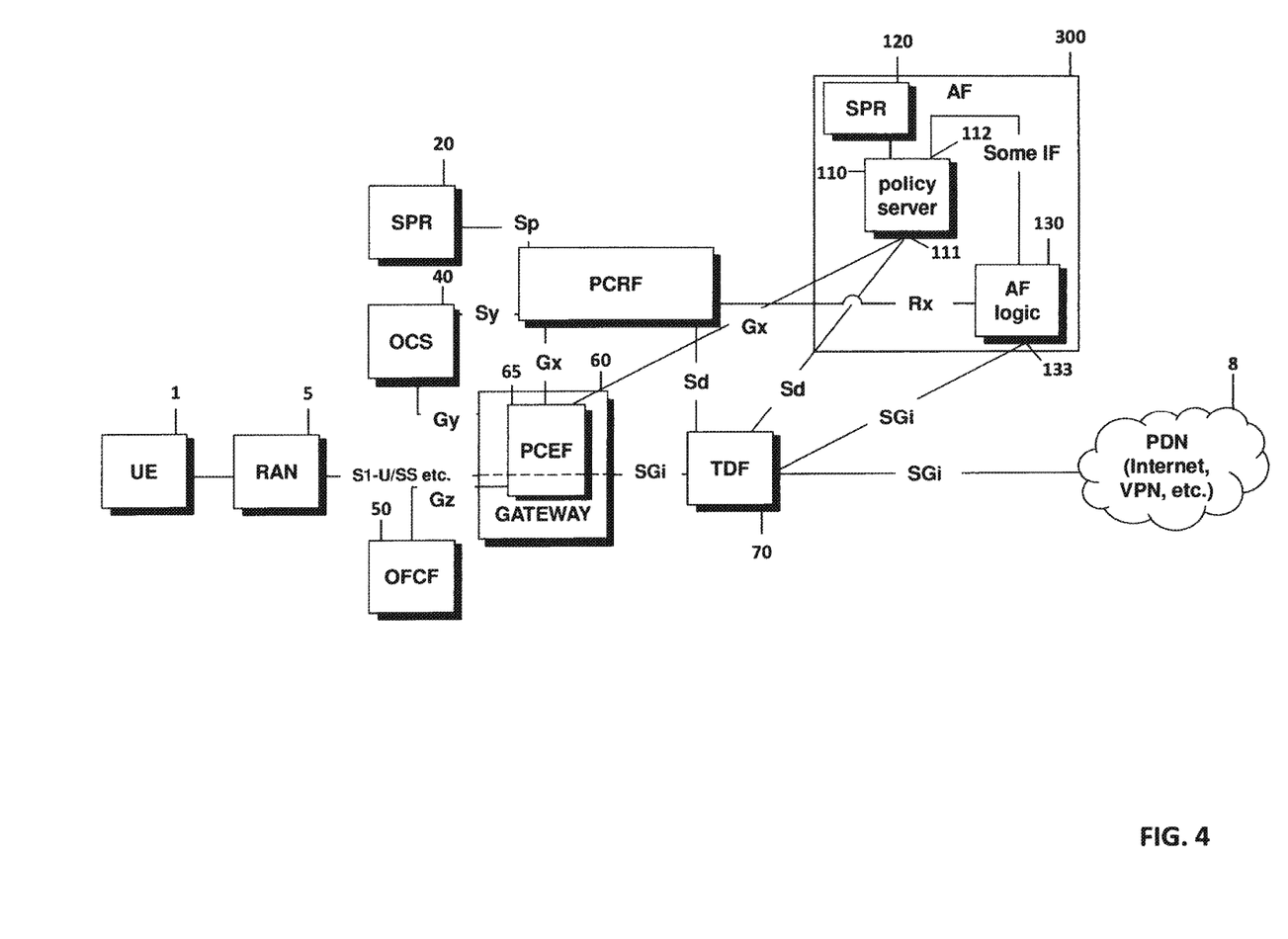

The entities shown in FIG. 2 and also those in FIGS. 3 and 4 may be implemented by hardware, software or a combination of hardware and software. For example, the entities can be implemented with a data processing system such as the one illustrated in FIG. 6. As depicted, the data processing system includes at least one processor that is coupled to a network interface via an interconnect. The memory can be implemented by a hard disk drive, flash memory, or read-only memory and stores computer-readable instructions. The at least one processor retrieves the computer-readable instructions from the memory and further executes the computer-readable instructions to implement the functionality described herein (such as the functionality performed by the application function entity, described herein), particularly in conjunction with FIG. 5. The network interface enables the data processing system to communicate with other data processing systems or nodes within a network. Alternative embodiments of the present invention may include additional components responsible for providing additional functionality, including any functionality described herein and/or any functionality necessary to support the solution described above.

In connection with FIG. 3, a further embodiment is disclosed, wherein the same reference numerals describe the same entities already discussed in connection with FIG. 2.

An application function entity 200 of FIG. 3 differs from the embodiment of FIG. 2 in that the packet inspection entity is not provided inside the application function, but that the interface 111 of the policy server is directed towards a packet inspection entity 150 located outside the application function.

In a further embodiment shown in connection with FIG. 4, the packet inspection functionality in the PCEF 65 and/or the packet inspection functionality of the TDF 70 is used.

In all three embodiments, the policy server 110 may be implemented as a PCRF. In the present context this means that it is a device capable of performing functions of a PCRF, but it is not the same entity as the PCRF 10 in FIG. 1.

The embodiments shown in connection with FIGS. 2 and 4 are advantageously used with the third approach mentioned in the introductory part where the user service is detected by the application function entity, as denoted with reference numerals 100 resp. 300 in FIGS. 2 and 4, respectively, using packet inspection. However, the present invention can also be used for the other two approaches mentioned above. For the first two approaches, the three embodiments of FIGS. 2-4 may act similarly as no Sd/Gx interface is needed to the PCRF 10.

Figure 5:
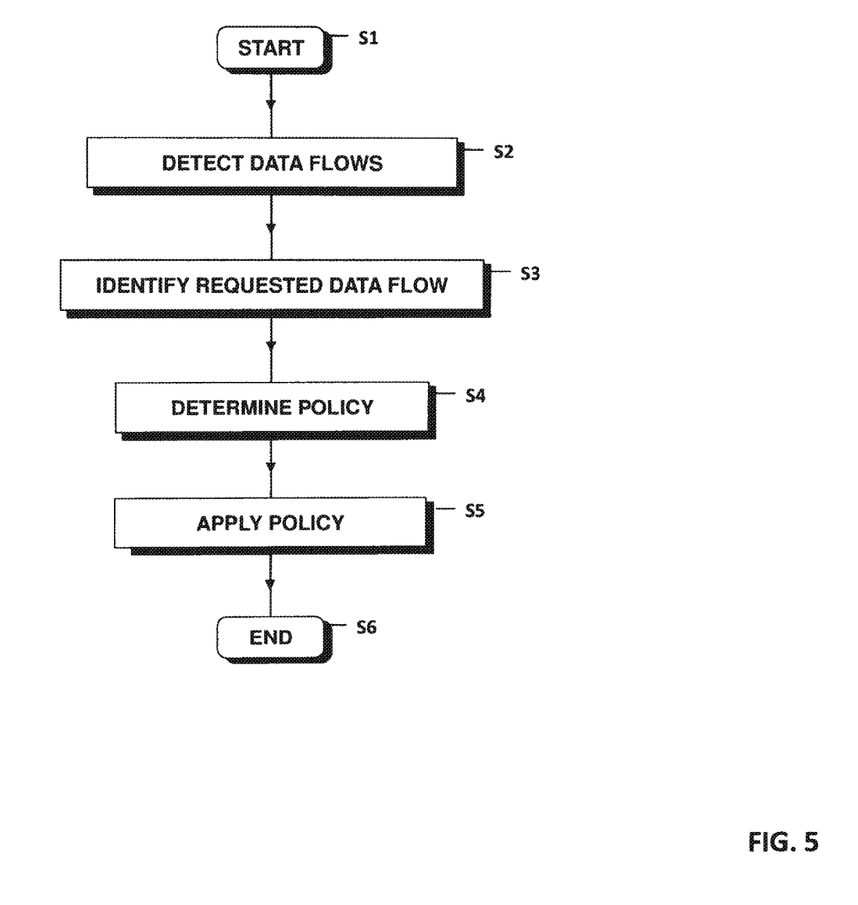
FIG. 5 shows a flow chart including the steps for applying policy rules by an application function in accordance with an embodiment of the invention.
Figure 6:
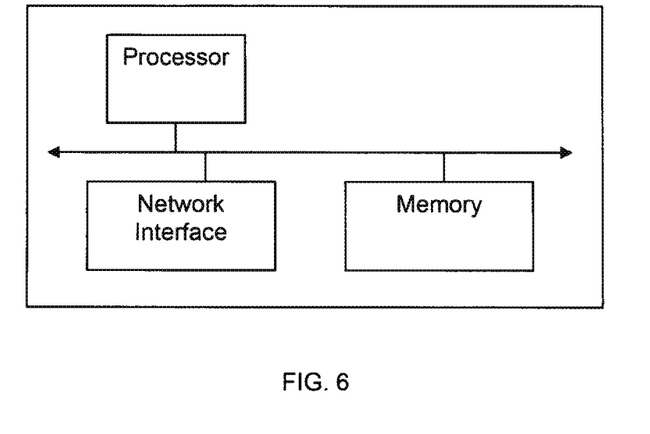
FIG. 6 shows a data processing system that can be utilized to implement the nodes and functions described in FIGS. 1-5, in accordance with an embodiment of the invention.

In FIG. 5, the steps are shown which make it possible to apply policy and charging rules independently from the policy and charging rules of the mobile communications network. In a step S1, the method starts and in step S2, the data flows between the UE and the packet data network are detected. In step S3, one of the data flows can be identified. The application function can then in step S4 determine the policy for the detected data flow. The policy may be subscriber dependent, but may also only depend on the identified data flow. In this case, all subscribers would have the same policy and/or charging rules. The application function dependent policy and charging rules are then applied in step S5, the method ending in step S6.

With the claimed invention, the customization, personalization or adaptation of the application function is possible on a per access session basis or even on a per subscriber basis. With the provision of a policy server, such as another PCRF, within the application function, a separate policy rules database, or a database containing subscriber information which the policy server takes into account when determining which policy rules to apply can be provided. A further advantage is that the configuration operation of the PCRF of the mobile communications network is completely decoupled from the configuration and operation of the policy server of the application function. A further advantage can be seen in the fact that existing standards, such as the Gx or Sd interfaces, can be used for the communication between the application function and the policy server so that existing hardware and software components can be used for implementation.

The PCRF 10 is the entity that has the control of the network nodes (PCEF, TDF, . . . ). The policy server 100, 200, 300 has the control over the AF, and so it can change the way the AF behaves. The policy server can influence the behaviour of the network PCRF by changing what the AF reports via the Rx id. The PCRF 10 may choose to ignore or take into account what the AF says via Rx, i.e., the PCRF 10 is the ultimate decision point for FIG. 2-3. In FIG. 4, the Sd and Gx interfaces towards the policy server are used for reporting purposes (i.e., only to send information from the TDF/PCEF to the policy server), and so the PCRF 10 remains as the ultimate decision point.

The content provider providing the contents for the packet based service data flow can now decide on the policy and charging rules for the subscriber. The use of the resources within the mobile communications network would still be controlled in the PCRF of the mobile communications network. The policy server controls how the AF behaves (e.g., when it is allowed to report via Rx to the PCRF 10, what it reports via Rx, . . . ). The policy server does not talk to the PCRF 10 directly, but indirectly via the AF. The PCRF 10 is the ultimate decision point: The PCRF 10 can chose to ignore what comes from the AF via Rx or it can take different decisions. If the AF requests that a flow should be free of change, the PCRF 10 can decide not to do it because (for example) the user is roaming.

The invention claimed is:

1. An application function apparatus configured to control policy rules of a packet based service data flow that is transmitted to a subscriber of a mobile communications network, the application function apparatus comprising:
a data processing system comprising one or more processors for implementing a policy server and implementing an application function (AF), a network interface, an interface towards a policy and charging rules function (PCRF) of the mobile communications network, and a data store storing a subscription profile repository (SPR) containing information from which policy rules can be determined, wherein the application function apparatus is configured to:
employ the AF to provide a service to a subscriber using a user device;
identify a packet based service data flow destined for the user device;
provide an identity of the subscriber;
employ the policy server to:
use the identity of the subscriber to obtain from the subscription profile repository subscriber information associated with the identified subscriber; and
determine, based on the subscriber information obtained from the subscription profile repository, a subscriber dependent policy rule for said identified packet based service data flow; and
apply the determined subscriber dependent policy rule, independently from the PCRF of the mobile communications network, to the said packet based service data flow, wherein
a single network node of the network contains each of the one or more processors for implementing the policy server and implementing the AF, the network interface, the interface towards the PCRF of the mobile communications network, and the data store storing the SPR, and
the application function apparatus is configured to apply the determined subscriber dependent policy rule by transmitting to the PCRF a request to increase the priority of the service data flow destined for the user device.

2. The application function apparatus of claim 1, further comprising an interface to a traffic detection function.

3. The application function apparatus of claim 2, wherein the traffic detection function comprises packet inspection capability.

4. The application function apparatus of claim 1, wherein the subscriber profile repository contains subscriber dependent subscriber profiles.

5. The application function apparatus of claim 2, wherein the interface towards the traffic detection function is implemented as an Sd or Gx interface.

6. The application function apparatus of claim 1, wherein the interface towards PCRF of the mobile communications network is implemented as an Rx interface.

7. The AF apparatus of claim 1, wherein the data processing system further implements a packet inspection (PI) function for detecting packet based service data flows.

8. The AF apparatus of claim 7, wherein
the policy server communicates with the PI function via an Sd or Gx interface to obtain information regarding the detected service data flows, and
the policy server uses the information regarding the detected service data flows to identify said service data flow destined for the user device.

9. A method for controlling, by an application function (AF) apparatus, policy rules of a packet based service data flow that is transmitted to a subscriber of a mobile communications network, the AF apparatus comprising a subscriber profile repository (SPR) containing information from which policy rules to be applied to packet based service data flows can be determined, a network interface, an interface towards a policy and charging rules function (PCRF) of the mobile communications network and further comprising a data processing system comprising one or more processors for implementing a policy server and implementing an application function (AF), the method comprising:
the AF apparatus employing the AF to provide a service to a subscriber using a user device;
the AF apparatus providing an identify of the subscriber;
the AF apparatus detecting packet based service data flows in the mobile communications network, said packet based service data flows in the mobile communications network comprising a packet based service data flow destined for the user device;
the AF apparatus identifying the packet based service data flow destined for the user device;
the AF apparatus using the identity of the subscriber to obtain from the subscription profile repository subscriber information associated with the identified subscriber;

the AF apparatus determining a subscriber dependent policy rule for said identified packet based service data flow based on the subscriber information obtained from the SPR; and the AF apparatus applying the determined subscriber dependent policy rule, independently from the PCRF of the mobile communications network, to the identified packet based service data flow, wherein a single network node of the network contains each of the one or more processors for implementing the policy server and implementing the AF, the network interface, the interface towards the PCRF of the mobile communications network, and the data store storing the SPR, wherein applying the determined subscriber dependent policy rule comprises the AF apparatus transmitting to the PCRF a request to increase the priority of the identified service data flow destined for the user device.

10. The method of claim 9, wherein the subscriber profile repository additionally contains charging rules, wherein the application function apparatus determines one or more charging rules for the identified packet based service data flow.

11. The method of claim 9, wherein policy rules are subscriber dependent policy rules, and wherein the subscriber is identified for which the packet based service data flow is provided, wherein the subscriber dependent policy rules are applied to the identified packet based service data flow.

* * * * *